(12) United States Patent
Friedman

(10) Patent No.: US 6,416,178 B1
(45) Date of Patent: Jul. 9, 2002

(54) COLOR TRANSLUCENT EYEWEAR LENSES APPLIED WITH ANTIREFLECTIVE (AR) COATINGS

(75) Inventor: Dean Friedman, Atlantic Beach, NY (US)

(73) Assignee: Eyecity.com, Inc., Plainview, NY (US)

( * ) Notice: Subject to any disclaimer, the term of this patent is extended or adjusted under 35 U.S.C. 154(b) by 0 days.

(21) Appl. No.: 09/576,918

(22) Filed: May 23, 2000

(51) Int. Cl.[7] .............................. G02C 7/10; G02C 7/16
(52) U.S. Cl. .............................................. 351/163; 351/45
(58) Field of Search ............................ 351/45, 163, 165, 351/44, 49, 159, 166

(56) References Cited

U.S. PATENT DOCUMENTS

| 4,470,673 A | 9/1984 | Gilson et al. | 351/44 |
|---|---|---|---|
| 4,542,964 A | 9/1985 | Gilson et al. | 351/44 |
| 4,698,022 A | 10/1987 | Gilson | 434/36 |
| 4,836,960 A | 6/1989 | Spector et al. | 264/2.2 |
| 4,838,673 A * | 6/1989 | Richards et al. | 351/44 |
| 4,872,749 A | 10/1989 | Lummis et al. | 351/44 |
| 5,096,626 A | 3/1992 | Takamizawa et al. | 264/1.7 |
| 5,372,504 A | 12/1994 | Buechler | 434/35 |
| 5,381,191 A | 1/1995 | Levy | 351/57 |
| 5,428,409 A | 6/1995 | Sliverstein | 351/45 |
| 5,432,568 A | 7/1995 | Betz et al. | 351/45 |
| 5,574,517 A * | 11/1996 | Pang et al. | 341/44 |

* cited by examiner

Primary Examiner—Jordan M. Schwartz
(74) Attorney, Agent, or Firm—J. de la Rosa

(57) ABSTRACT

The present invention is addressed to solving the problem of AR coating lenses having at least one or more. textured translucent regions, without altering the effectiveness of the translucent regions to reduce glare. A part of the uniqueness of the present invention is that the AR coating is applied on the surface that opposes the translucent region. As such, part of the invention is the discovery that AR coating the lens on the surface opposing the translucent regions does not limit its ability to block glare inasmuch as the coating does not alter the surface contour of the translucent region.

16 Claims, 3 Drawing Sheets

COLOR TRANSLUCENT EYEWEAR LENSES APPLIED WITH ANTIREFLECTIVE (AR) COATINGS

CROSS-REFERENCE TO RELATED APPLICATION

This application is related to applicant's co-pending U.S. patent application Ser. No. 09/195,719, which was filed on Nov. 18, 1998. The above-identified application, which is commonly assigned, is incorporated herein by reference.

TECHNICAL FIELD

The present invention relates to eyewear, and more particularly, to eyewear, such as eyeglasses having lenses with translucent regions used to reduce glare and/or increase visual acuity.

BACKGROUND OF THE INVENTION

In recent years, various eyewear designs have been proposed to reduce glare and/or improve visual acuity, such as for use when viewing visual display terminals (VDTs) or participating in athletic activities. One particular eyewear design includes the use of upper and/or lower translucent bands or regions to reduce the amount of glare resulting from, for example, veiling illumination or ground glare. With respect to such an eyewear design, selected patents as discussed herein below are of interest, and are incorporated herein by reference.

U.S. Pat. No. 4,542,964 to Gislon et al. discloses an eyewear for reducing asthenopia developed by operators of visual display terminals (VDTs). The eyewear includes a frame removably positioned before the eyes which supports a transparent or clear optical region having an area extent for intercepting lines of sight only substantially below the mid-pupillary location of the eye. A translucent region extending upward from this latter mid-pupillary location advantageously blocks the eye's superior field of view so as to reduce the amount of veiling illumination, such as from overhead and/or window lighting. Importantly, the translucent region is formed as having light diffusing characteristics, but of sufficient diffuse luminance to avoid the wearer experiencing a so-called "blinder" effect. See also, U.S. Pat. No. 4,470,673, which discloses similar eyewear.

U.S. Pat. No. 5,432,568 to Betz discloses an eyewear which reduces glare-related vision problems for target shooters, hunters, archers, and the like. The eyewear includes a transparent region provided within the frontal portion of, for example, eyeglasses, for intercepting lines of sight substantially above and below the standard line of sight located at about the mid-pupillary position of the eyes. To both reduce overhead glare, and glare reflected from the ground to a constant level of diffuse illumination, upper and lower translucent regions are used. Upper and lower translucent regions are provided to extend from the standard line of sight, and the upper and lower peripheries of the frontal portion of the eyeglasses, respectively, so as to intercept portions of the superior and inferior field of views.

Various methods may be used to fabricate the translucent region(s), such as by roughing or texturizing a portion of the front surface of the lens through sanding, sandblasting or chemical etching. Alternatively, the translucent optical region can be formed by coating, for example, a portion of the front surface of the lens with a material of sufficient translucency.

Unfortunately, not only are the prior art methods labor intensive, but also somewhat difficult to control, often resulting in poor quality and consistency. In applicant's co-pending application identified herein above, a new process is disclosed for manufacturing eyewear lenses having at least one or more translucent regions, without the associated problems of the prior art. More specifically, to overcome the limitations of the prior art, applicant disclosed the use of an injection mold die having a selective portion thereof textured with a pattern or so-called "texture." This texture is replicated on the lens during molding, and employed to form the region of desired translucency on the finished lens.

In applicant's co-pending application, an antireflective (AR) coating is also disclosed in combination with the translucent region, but applied to the clear portion of, for example, the front surface of the lens because of the discovered increased transmissivity if applied to the textured translucent region(s). That is, coating the textured translucent region(s) with an AR optical thin film would limit the translucent region's ability to reduce overhead glare as well as ground glare because of its reduced ability to block glare.

Selectively coating the front surface of the lens, however, unfortunately increases the manufacturing cost. Accordingly, it is desirable in the art to provide for a more cost effective method for AR coating such lenses.

SUMMARY OF THE INVENTION

The present invention is addressed to solving, among others, the problem of AR coating lenses having at least one or more textured translucent regions, without altering the effectiveness of the translucent regions to reduce glare. A part of the uniqueness of the present invention is that the AR coating is applied on the surface that opposes the translucent region. Normally, the AR coating is applied on the clear region of the lens and only up to the lower border of the translucent region because of the increased transmissivity if applied to the translucent region. However, part of this invention is the discovery that AR coating the lens on the surface opposing the translucent regions does not limit its ability to block glare inasmuch as the coating does not alter the surface contour of the translucent region.

Preferably, the lens is tinted using, for example, conventional dying to further improve visual acuity. For example, the lens may be tinted with a color from the mid-spectral range of the visible spectrum, such as yellow and/or amber, where the spectral sensitivity of the eye is about at its peak. Of course, the lens may be fabricated for general use as sunglasses so as to reduce reflected glare.

Also, various optical coatings can also be applied on the surface that opposes the translucent region to imbue the lens with various desired optical transmission properties. For example, by suitable combinations of thin films of different indices and thickness, a tremendous number of transmission effects can be created from the resulting interference coating. Among the types of interference coatings which can be created are long or short wavelength transmission filters, band pass filters, or narrow bandpass filters. Other optical coatings may be applied to the opposing surface, such as an ultraviolet (UV), or polarization coatings.

Furthermore, it is contemplated that the lens may be also provided with a relatively low plus optical power, selected below about one diopter, about from 0.25 to 0.75 diopters. This correction enables the user to focus on near objects, without needing accommodation otherwise required if the clear region were plano in nature, thereby reducing or eliminating blurring that would occur at both distance and near viewing as a result of long periods of viewing.

BRIEF DESCRIPTION OF THE DRAWINGS

The features and advantages of the present invention will become more readily apparent from the following detailed description of the invention in which like elements are labeled similarly and in which.

DETAILED DESCRIPTION

Figure 1:
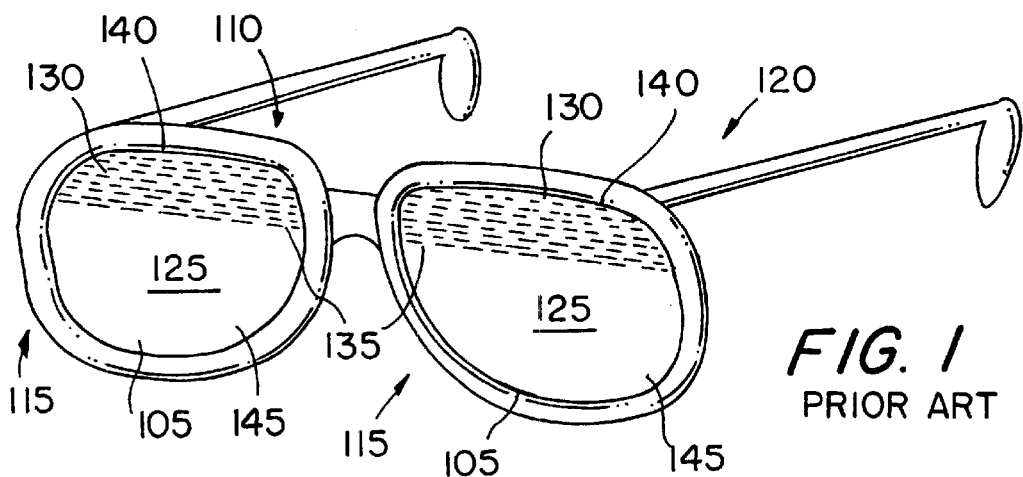
FIG. 1 is a perspective view of an exemplary prior art pair of eyeglasses incorporating lenses having translucent regions for reducing glare.
Figure 2:
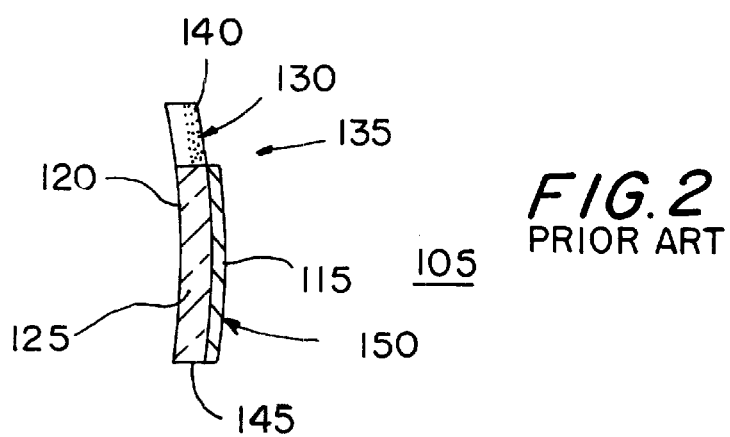
FIG. 2 is a cross section view of the translucent lens shown in FIG. 2.

In known eyewear designs, translucent regions are judiciously disposed on the lens to extend upward and/or downward from about the eye's standard line of sight for reducing glare, such as from veiling illumination, ground glare, and the like. As shown in FIGS. 1 and 2, prior art lenses 105 may be used in combination with a pair of eyeglass frame 110 for viewing, for example, a visual display terminal, among other things. Each Lens 105 has a front surface 115 (referring to the concave surface) and a back surface 120 (referring to the convex surface), with the curvatures thereof corresponding to the desired optical vision prescription of lenses 105. Lenses 105 have a clear or transparent optical region 125 made, for example, of a thermoplastic material through which a user views along a standard line of sight, extending from about the mid-pupillary position (MPP) of the eye upwardly about 50° and downwardly about 70°.

Importantly, each lens 105 also includes a translucent region 130 fabricated on a corresponding portion of front surface 115, extending from a lower border or margin 135 to the top periphery 140 of lens 105. In this manner, translucent region 130 intercepts a portion, if not all, of the superior field of view so as to reduce glare emanating from, for example, overhead lighting sources. The superior field of view typically extends about 50° upward from the standard line of sight. Clear optical region 125, however, extends from lower border 135 downward to the bottom periphery 145 of lens 105 so as to intercept most, if not all, of the inferior field of view, which typically extends about 70° downward from the standard line of sight.

Depending upon the application for which lenses 105 are intended, or upon the preference of the wearer, translucent regions 130 may be extended or decreased in area extent to correspondingly provide an increased glare reduction or an extended field of view.

In the prior art, various methods have been employed to fabricate translucent region(s) 130, such as by roughing or texturizing the front surface of lens 105 through sanding, sandblasting or chemical etching. Unfortunately, not only are these prior art methods labor intensive, but also somewhat difficult to control, often resulting in poor quality and consistency. Accordingly, translucent optical region(s) 130 is preferably formed by employing the novel method disclosed in applicant's co-pending application, identified herein above.

In applicant's co-pending application, a novel process is disclosed for manufacturing eyewear lenses having at least one or more translucent regions, without the associated problems of the prior art. More specifically, to overcome the limitations of the prior art, in the above-identified co-pending application, applicant disclosed the use of an injection mold die having a selective portion thereof textured with a pattern or so-called "texture." This texture is replicated on the surface of lens during molding, and employed so as to form textured translucent region 130.

In applicant's co-pending application, an antireflective (AR) coating 150 is also disclosed in combination with translucent region 130, but applied to the clear portion 125 on, for example, front surface 115 of the lens because of the observed increased transmissivity if applied to textured translucent region(s) 130. That is, applicant found that coating textured translucent region(s) 130 would limit its ability to reduce overhead glare as well as ground glare because of its increased transmissivity.

Although not prohibitively costly, selectively coating only a portion of front surface 115 of the lens, however, increases the manufacturing cost. Accordingly, in accordance with the principles of the invention, a more cost effective method, among other things, is disclosed herein below for providing such lenses with an AR coating.

Figure 3:
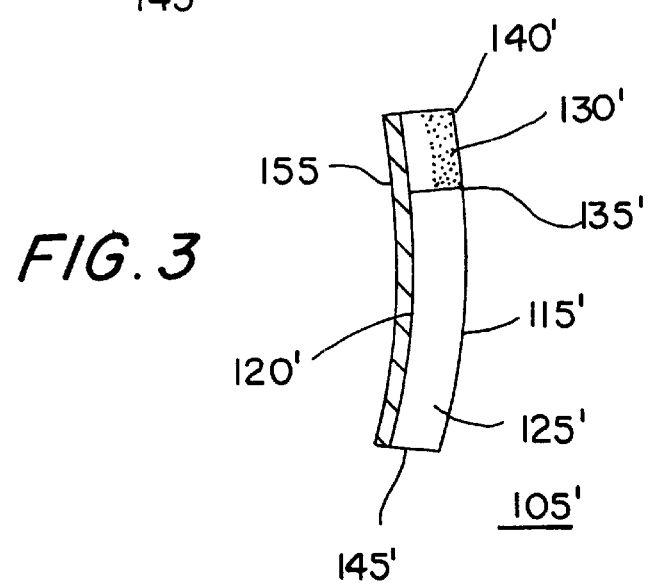
FIG. 3 is a cross section view of a translucent lens in accordance with the principles of the invention.
Figure 4A:
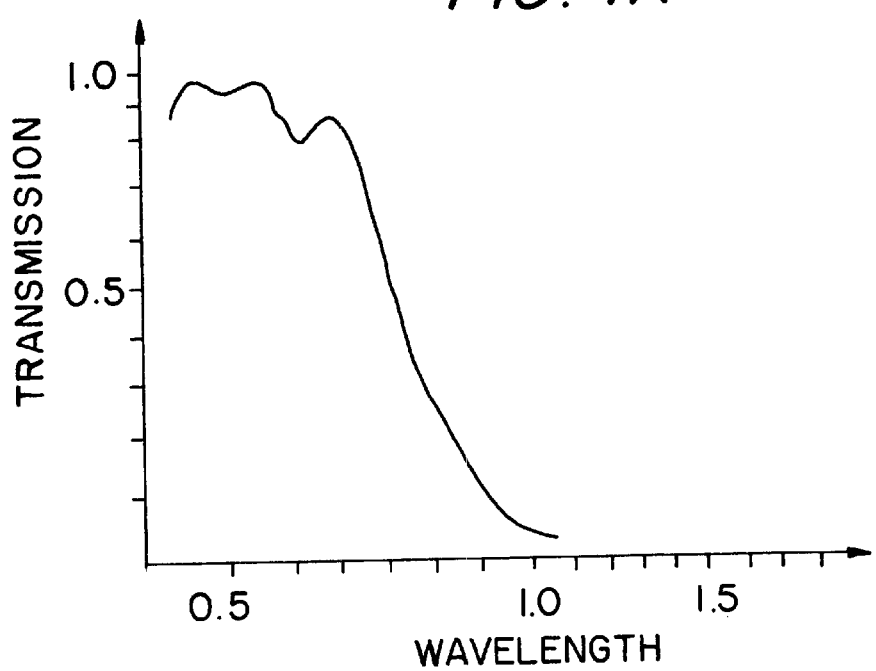
FIG. 4 is a depiction of the spectral transmission characteristics of a number of interference coatings which can be applied to surface opposing the translucent region for the lens shown in FIG. 3.
Figure 4B:
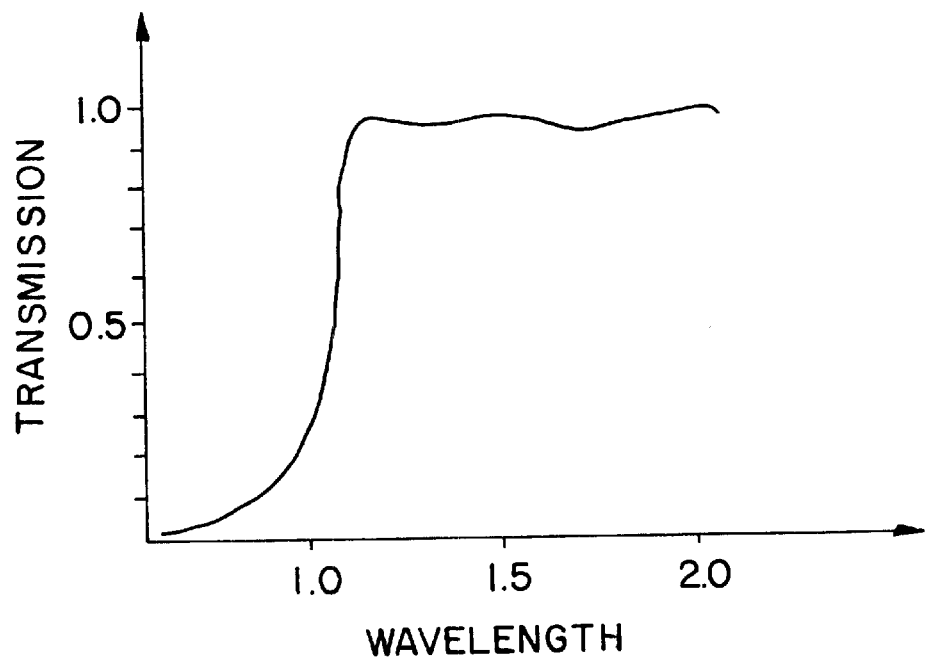
Figure 4C:
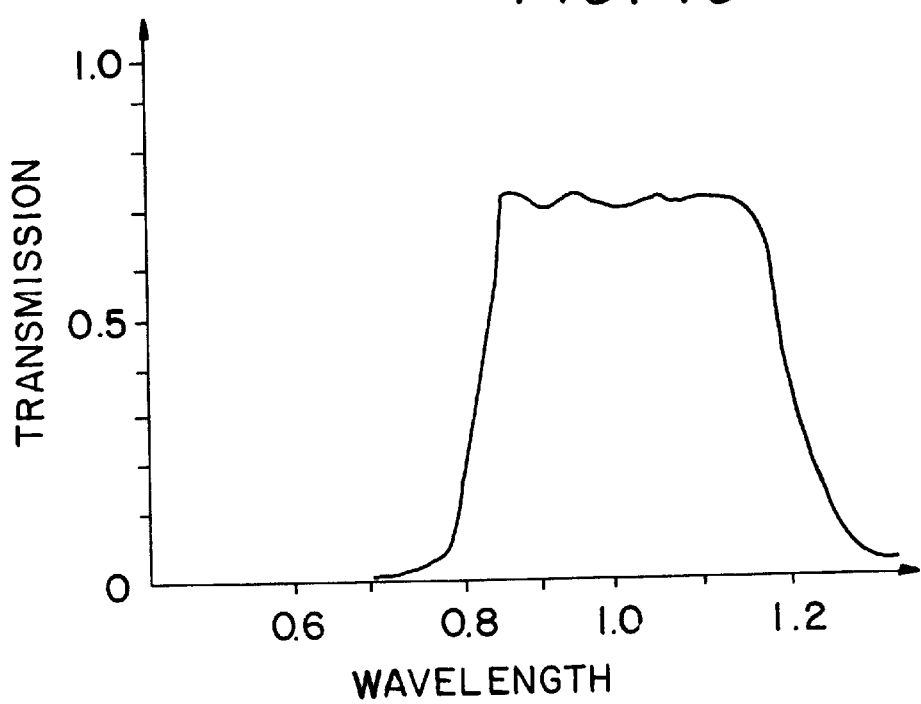
Figure 4D:
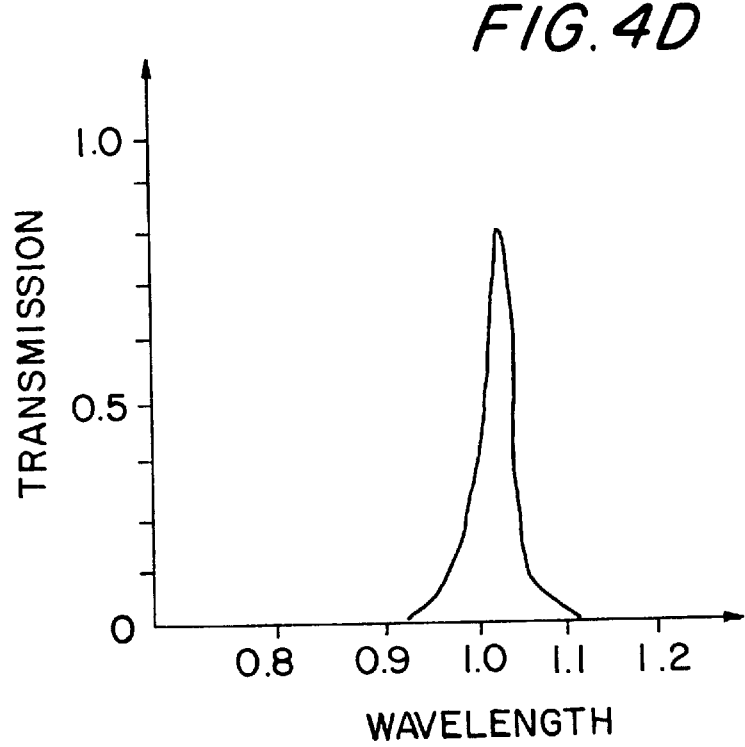

Now referring to FIG. 3, there is shown a lens 105' according to one embodiment of the present invention, formed preferably of a single piece of glass, plexiglass, plastic, or other suitable lens material. Likewise, each lens 105' has a front surface 115' (referring to the concave surface) and a back surface 120' (referring to the convex surface). Each lens 105' also has a translucent region 130', and a transparent optical region 125' through which the user views along a standard line of sight.

Translucent region 130' is fabricated on a portion of, for example, front surface 115', extending from a lower border or margin 135' to the top periphery 140' of lens 105'. In this manner, translucent region 130' intercepts a portion, if not all, of the superior field of view so as to reduce glare emanating from, for example, overhead lighting sources. Clear optical region 125', similarly extends from lower border 135' downward to the bottom periphery 145' so as to intercept most, if not all, of the inferior field of view.

A part of the uniqueness of the present invention is that an antireflective (AR) optical coating 155 is applied on the surface opposing translucent region 130' (referring in this case to back surface 120'). Normally, the AR coating, either single or multi-layer thin films, is applied on clear optical region 125' because of the discovered increased transmissivity if applied to translucent region(s) 130'. However, part of this invention is the discovery that coating the lens on the surface opposing translucent region 130' does not limit the ability of the translucent region to block glare inasmuch as the coating does not alter the surface contour of the textured translucent region.

More specifically, after lens 105' has been textured with the desired translucent regions 130', preferably in accordance with the teachings of applicant's co-pending application, lens 105' may then be passed through an ultrasonic wave cleaning process to remove unwanted dirt and dust on the lens. The cleaning may also include washing the lenses with various synthetic cleaning solutions. After a thorough cleaning, AR coating 155 is deposited on the surface opposing translucent region 130' (herein back surface 120'), using a conventional vacuum coating machine. Conventional AR coatings, such as a metallic oxide or fluoride, may be applied to opposing surface 120' to help reduce reflections caused from light emanating behind the wearer. More specifically, the deposition is carried out in a vacuum and is done by heating the materials to be deposited to their respective evaporation temperatures and allowing them to condense on the opposing surface. Lens 105' may be then readily cut or edged to any peripheral shape such that the lens engages eyeglass frames of various shapes and sizes.

Lens 105' is also tinted using, for example, conventional dying to further improve visual acuity. That is, lens 105' may be fabricated of a pigmented clear material. For example, conventional methods may be used to tint the lenses, such as by mixing the thermoplastic material with an inert color pigment that diffuses uniformly through the plastic. For example, lens 105' may be tinted with a color from the midspectral range of the visible spectrum, such as yellow and/or amber, where the spectral sensitivity of the eye is about at its peak. Also, inasmuch as the human eye exhibits a considerable amount of chromatic aberration, the eye only focuses one wavelength precisely on the retina. All other wavelengths are focused at some focal point in front or behind the retina. Tinting the lens yellow and/or amber serves to reduce the chromatic aberration by eliminating certain wavelengths, which are most out of focus, without a perceived darkening effect. Of course, for certain athletic activities, other color tints beside yellow and/or amber may be employed to improve eye comfort and visual acuity.

Of course, lens 105' may also be fabricated for general use as sunglasses so as to reduce reflected glare. In this latter case, non-spectral pigmentation may be used, such as a gray or brown tint. Where the lenses are fabricated of a polycarbonate material, a desirable blocking of ultraviolet (UV) radiation additionally may be effected to provide the wearer with enhanced eye protection.

Additionally, various optical coating may be applied to surface opposing surface so as to imbue the lens with the desired optical transmission properties, without altering the optical transmissive properties of translucent region 130'. For example, by suitable combinations of thin films of different indices and thickness, a tremendous number of transmission effects can be created from the resulting interference coatings. Among the types of interference coatings which can be created are long or short wavelength transmission filters, band pass filters, or narrow bandpass filters. The transmission characteristics of a number of typical interference coatings are shown in FIG. 4, with the wavelength plotted in arbitrary units and centered on a wavelength of 1. More particularly, FIG. 4(*a*) depicts a short pass filter; FIG. 4(*b*) depicts a long pass filter; FIG. 4(*c*) depicts a band pass filter; and FIG. 4(*d*) depicts a narrow band pass filter.

Additionally, other optical coatings may be applied to opposing surface 120', such as an ultraviolet (UV) coating. Lens 105' as well may be advantageously treated with an ultraviolet absorbing thin film to filter out 90% and preferably more than 99% of the ultraviolet radiation between about 300 nm and 400 nm. Again, such an optical coating would be applied to back surface 120', which in this case opposes the surface on which translucent region 130' is fabricated.

By way of reiteration, it should be clearly understood that optical coating 155 is applied to the surface opposing textured translucent region 130', in this case the inside of the lens, rather than the outside. As such, there is no change in the optical properties of textured translucent region(s) 130' inasmuch as optical coating 155 does not alter the surface contour of textured translucent region 130', and hence the latter's optical transmission properties.

Alternatively, translucent region 130' can be fabricated on a portion of back surface 120'. In this latter case, optical coatings, such as AR coating 155, is applied to the front surface 130'.

It is well known that when a subject changes visual fixation from a distance object or target to nearer objects, there occurs a neurological triad response. For example, when viewing a VDT or computer screen at a close distance, the ciliary body within the eye changes the shape of the cornea to obtain a clear retinal image of the screen. After an extended viewing period, however, the eye becomes under-accommodated, which results in a blurring of near objects. When, the viewer then looks at a distant object, accommodation is not completely relaxed, and the viewer remains over-accommodated, with distance objects then also becoming blurred.

Accordingly, it is contemplated that lens 105' may be also provided with a relatively low plus optical power, selected below about one diopter, about from 0.25 to 0.75 diopters. This correction enables the user to focus on near objects, without needing accommodation otherwise required if the clear region were plano in nature, thereby reducing or eliminating blurring that would occur at both distance and near viewing as a result of long periods of viewing. In effect, the added optical power reduces the amount of ciliary contraction required for the user to focus on, for example, the computer screen. Of course, the lenses may be fabricated in the form of prescription lenses with an optical power from about 0.25–4.00 diopters.

Although in the above embodiment only a single translucent region has been fabricated on the lens for reducing glare related vision problems, in certain sporting activities, it is advantageous to not only reduce overhead glare, but also glare reflected from the ground. As such, the above eyewear lenses may be fabricated to include both upper and lower translucent regions for use in target shooting and, in general, sporting activities. See, for example, U.S. Pat. No. 5,432,568, which is incorporated herein by reference.

It should be clearly understood that the embodiments herein are merely illustrative of the principles of the invention. Various modifications may be made by those skilled in the art which will embody the principles of the invention and fall within the spirit and the scope thereof.

What is claimed is:

1. A lens for eyeglasses comprising a translucent region selectively formed on a surface portion of the lens, said translucent region being textured with a predetermined pattern so as to imbue said translucent region with light diffusing characteristics, with the remaining portion being a transparent and colored, and an antireflective (AR) coating applied to the surface of lens opposing said translucent region.

2. The lens of claim 1 wherein the surfaces of said lens have surface contours so as to thereby provide said lens with an optical power.

3. The lens of claim 2 wherein said optical power is about from 0.25 to 4.00 diopters.

4. The lens of claim 1 further comprising an optical coating also applied to the surface of the lens opposing said translucent region so as to imbue said lens with the desired optical transmission properties.

5. The lens of claim 4 wherein said optical coating is an ultraviolet (UV) coating.

6. The lens of claim 4 wherein said optical coating is an interference optical coating.

7. The lens of claim 6 wherein said interference optical coating is a short pass optical filter.

8. The lens of claim 6 wherein said interference optical coating is a long pass optical filter.

9. The lens of claim 6 wherein said interference optical coating is a band pass optical filter.

10. The lens of claim 6 wherein said interference optical coating is a narrow band pass optical filter.

11. The lens of claim 1 wherein said translucent region is sufficient in area extent to intercept a portion of the superior field of view.

12. The lens of claim 1 wherein said translucent region is sufficient in area extent to intercept a portion of the inferior field of view.

13. The lens of claim 1 wherein said translucent region has light diffusing characteristics, but allows the transmission of diffuse luminance.

14. The lens of claim 1 wherein the color of said transparent color region is yellow and/or amber.

15. The lens of claim 1 wherein the color of said transparent color region is brown.

16. The lens of claim 1 wherein the color of said transparent color region is gray.

* * * * *